(12) United States Patent
Hamzah

(10) Patent No.: US 11,359,477 B2
(45) Date of Patent: Jun. 14, 2022

(54) IDENTIFYING AND MITIGATING TIGHT SPOTS IN A BOREHOLE USING BOTTOM HOLE ASSEMBLY COMPONENTS AS TEST PROBES

(71) Applicant: Schlumberger Technology Corporation, Sugar Land, TX (US)

(72) Inventor: Mohammad Hamzah, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 521 days.

(21) Appl. No.: 16/252,673

(22) Filed: Jan. 20, 2019

(65) Prior Publication Data

US 2020/0232311 A1 Jul. 23, 2020

(51) Int. Cl.
| | |
|---|---|
| *E21B 44/00* | (2006.01) |
| *G05B 19/404* | (2006.01) |
| *G01B 5/12* | (2006.01) |
| *E21B 44/02* | (2006.01) |
| *G01V 9/00* | (2006.01) |

(52) U.S. Cl.
CPC ............... *E21B 44/00* (2013.01); *E21B 44/02* (2013.01); *G01B 5/12* (2013.01); *G01V 9/00* (2013.01); *G05B 19/404* (2013.01); *G05B 2219/45129* (2013.01)

(58) Field of Classification Search
CPC .......... E21B 44/00; E21B 44/02; E21B 47/08; E21B 2200/22; G05B 19/404; G05B 2219/45129; G01B 5/12; G01B 5/18; G01V 9/00
See application file for complete search history.

(56) References Cited

U.S. PATENT DOCUMENTS

2016/0290121 A1 10/2016 Wesley et al.

OTHER PUBLICATIONS

Chatar et al., Overcoming a Difficult Salt Drilling Environment in the Gulf of Mexico: A Case Study, Feb. 2-4, 2010, 2010 IADC/SPE Drilling Conference and Exhibition, New Orleans, Louisiana, pp. 1-12 (Year: 2010).*
One Petro Search Results, May 6, 2021, 10 pp. (Year: 2021).*

* cited by examiner

*Primary Examiner* — Toan M Le
(74) *Attorney, Agent, or Firm* — Alec J. McGinn

(57) ABSTRACT

A computer-implemented method includes monitoring, by a computing device, data measurements associated with a bottom hole assembly (BHA), and detecting, by the computing device, a plurality of possible tight instances. An individual possible tight spot instance is detected based on a data measurement satisfying a threshold. The method also includes determining, by the computing device, information identifying respective probe depths of a plurality of probes incorporated by the BHA for the individual possible tight spot instance, storing, by the computing device and in a table, the information identifying the respective probe depths for each possible tight spot instance, generating, by the computing device, a profile identifying tight spot depths based on information stored in the table; and executing, by the computing device, a mitigating instruction based on the profile to mitigate the presence of the identified tight spot depths.

22 Claims, 9 Drawing Sheets

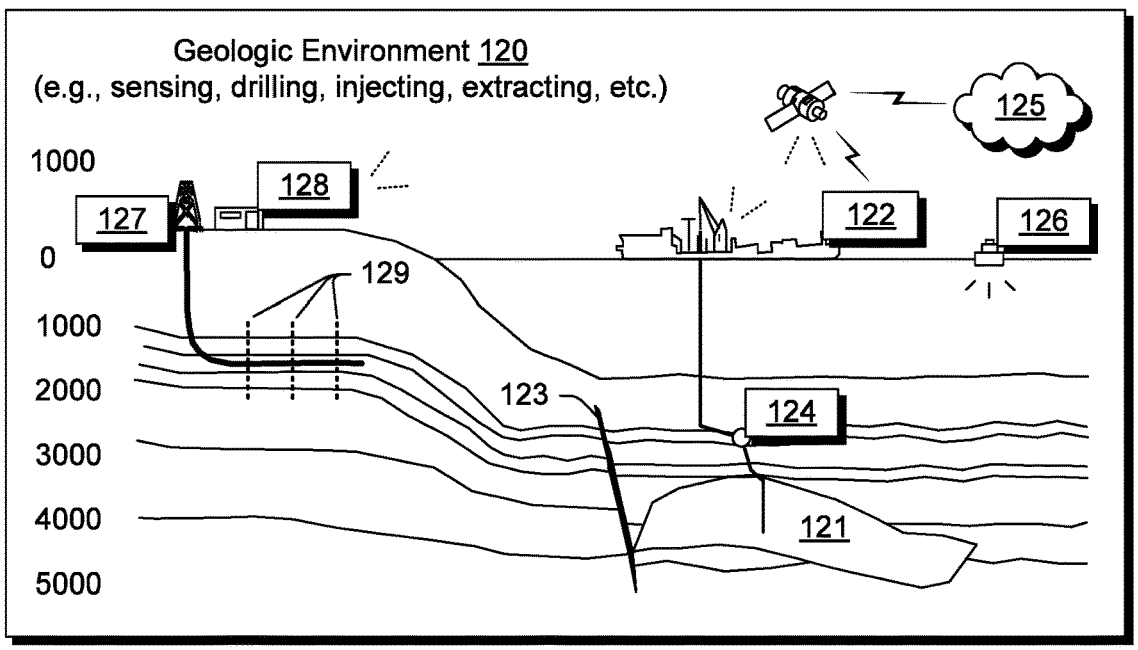
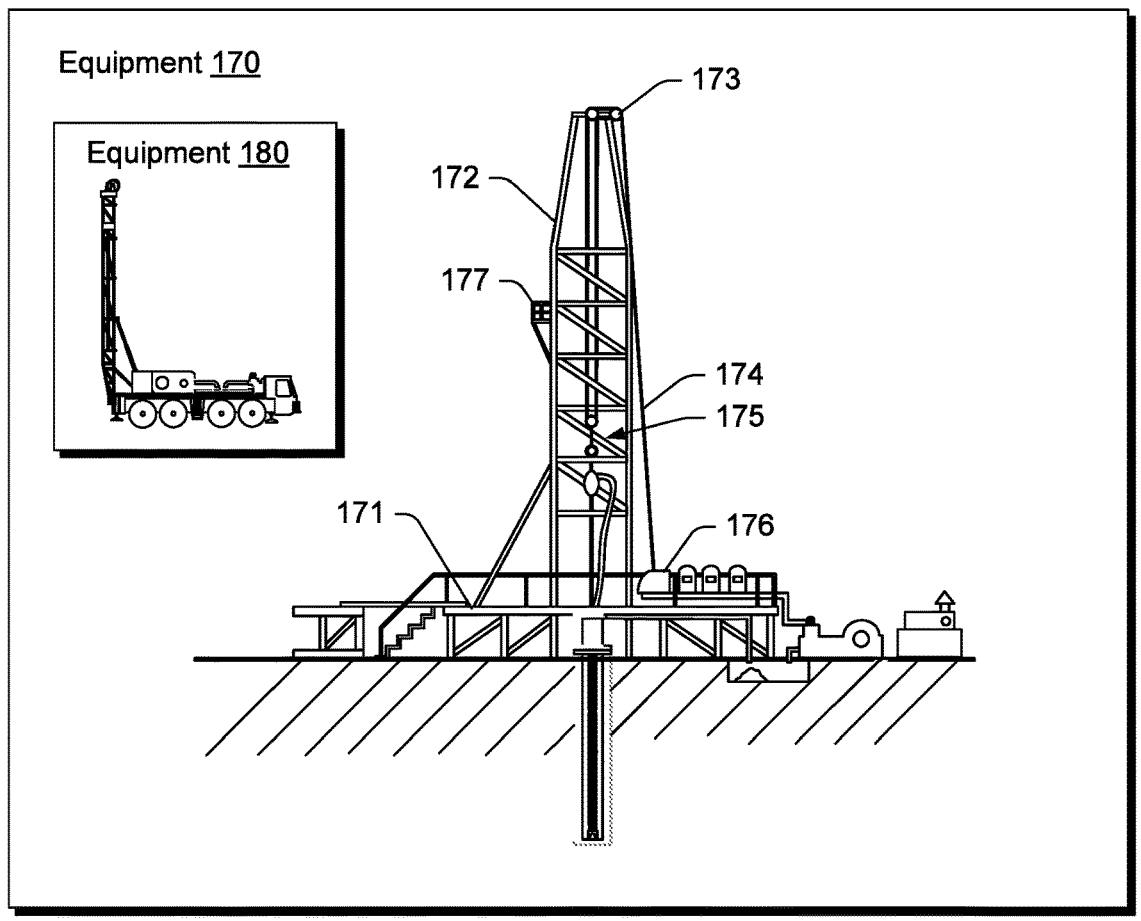
Fig. 1

600 ⟶

| Probe # | Depth (Meters) by instance | | | |
|---|---|---|---|---|
|  | 1 | 2 | 3 | 4 |
| 1 | 2500 | 3000 | 3500 | 4000 |
| 2 | 2000 | 2500 | 3000 | 3500 |
| 3 | 1500 | 2000 | 2500 | 3000 |
| 4 | 1000 | 1500 | 2000 | 2500 |

650 ⟶

| Depth | Count |
|---|---|
| 1000 | 1 |
| 1500 | 2 |
| 2000 | 3 |
| 2500 | 4 |
| 3000 | 3 |
| 3500 | 2 |
| 4000 | 1 |

Fig. 6

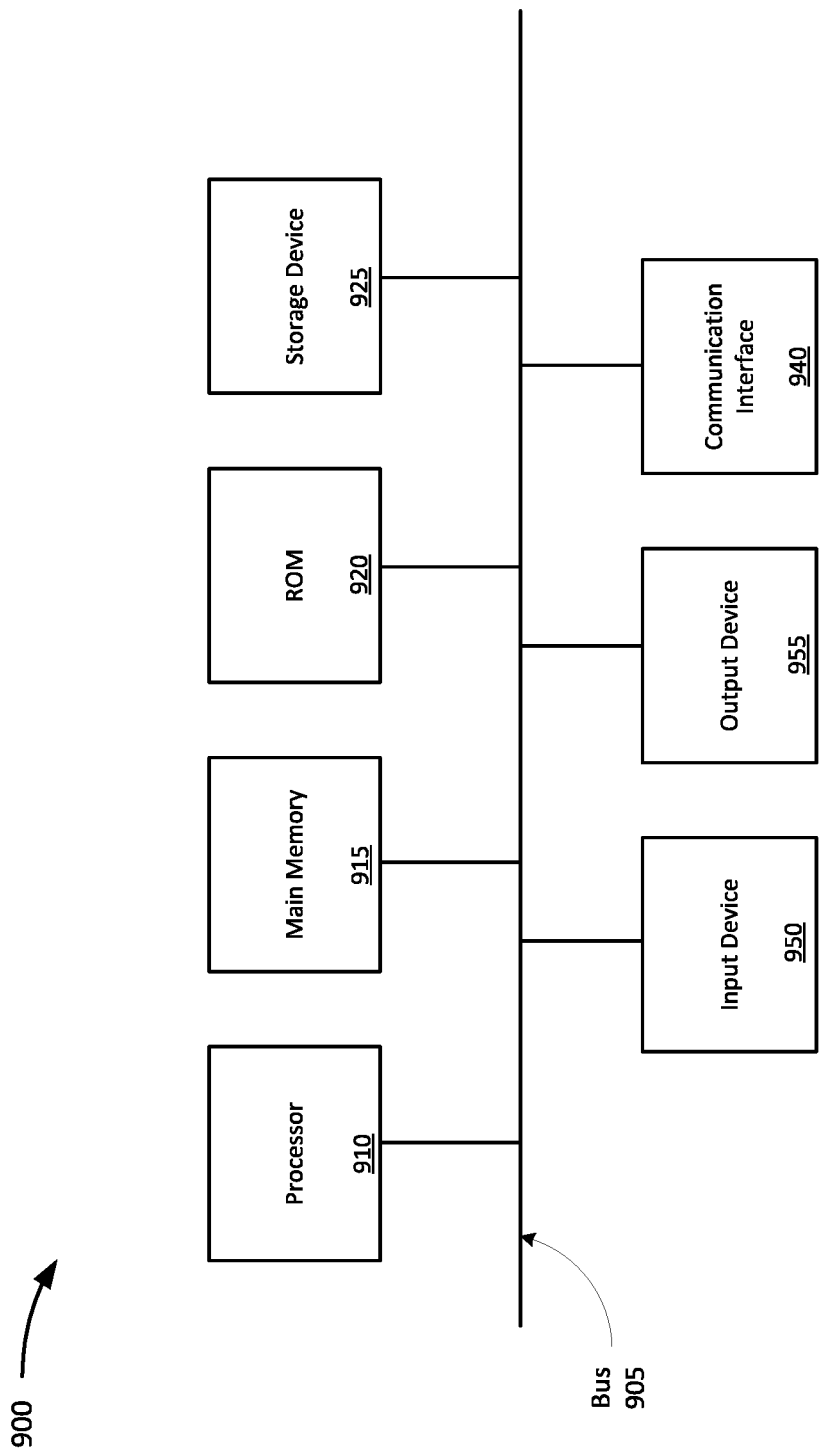

US 11,359,477 B2

IDENTIFYING AND MITIGATING TIGHT SPOTS IN A BOREHOLE USING BOTTOM HOLE ASSEMBLY COMPONENTS AS TEST PROBES

BACKGROUND

During a well construction operation (e.g., in drilling and casing operations), the bottom hole assembly (BHA) of a drill string may come into contact with a partial obstruction (e.g., while drilling a hole as part of the well construction operation), sometimes referred to as a "tight spot". For example, a tight spot may be or include unremoved cuttings that were previously left in the hole and/or a geometric restriction in the wellbore.

Such tight spots can increase the drag force on the BHA and/or drill string, and can increase the potential for the drill string to become stuck in the wellbore. Stuck pipes can result in expensive and time-consuming remediation efforts and thus care is taken to avoid such situations. Tight spots can be remediated or avoided, generally if the location thereof is identified in the wellbore. This is typically done by recording when the drag forces on the string increase; however, because the length of the string can be quite long, finding the actual location of the tight spot with a meaningfully-low uncertainty can be a challenge.

SUMMARY

In one example aspect, a computer-implemented method includes monitoring, by a computing device, data measurements associated with a bottom hole assembly (BHA), and detecting, by the computing device, a plurality of possible tight instances. An individual possible tight spot instance is detected based on a data measurement satisfying a threshold. The method also includes determining, by the computing device, information identifying respective probe depths of a plurality of probes incorporated by the BHA for the individual possible tight spot instance, storing, by the computing device and in a table, the information identifying the respective probe depths for each possible tight spot instance, generating, by the computing device, a profile identifying tight spot depths based on information stored in the table; and executing, by the computing device, a mitigating instruction based on the profile to mitigate the presence of the identified tight spot depths.

In one example aspect, a computer program product includes a computer readable storage medium having program instructions embodied therewith. The program instructions executable by a computing device to cause the computing device to: monitor data measurements associated with a bottom hole assembly (BHA); detect a plurality of possible tight instances, wherein each possible tight spot instance is detected based on a data measurement satisfying a threshold; determine information identifying respective probe depths of a plurality of probes incorporated by the BHA for each possible tight spot instance; store the information identifying the respective probe depths for each possible tight spot instance; generate a profile identifying tight spot depths based on information stored in the table; and execute a mitigating instruction based on the profile to mitigate the presence of the identified tight spot depths.

In one example aspect, a system includes: a processor, a computer readable memory and a computer readable storage medium associated with a computing device; program instructions to monitor data measurements associated with a bottom hole assembly (BHA); program instructions to detect a plurality of possible tight instances, wherein each possible tight spot instance is detected based on a data measurement satisfying a threshold; program instructions to determine information identifying respective probe depths of a plurality of probes incorporated by the BHA for each possible tight spot instance; program instructions to store the information identifying the respective probe depths for each possible tight spot instance; program instructions to generate a profile identifying tight spot depths based on information stored in the table; and program instructions to execute a mitigating instruction based on the profile to mitigate the presence of the identified tight spot depths. The program instructions are stored on the computer readable storage medium for execution by the processor via the computer readable memory.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

FIG. 1 illustrates examples of equipment in a geologic environment.

FIG. 6 shows example data structures of a tight spot table and tight spot composite log in accordance with aspects of the present disclosure.

FIG. 9 illustrates example components of a device that may be used within environment of FIG. 4.

DETAILED DESCRIPTION

Figure 2:
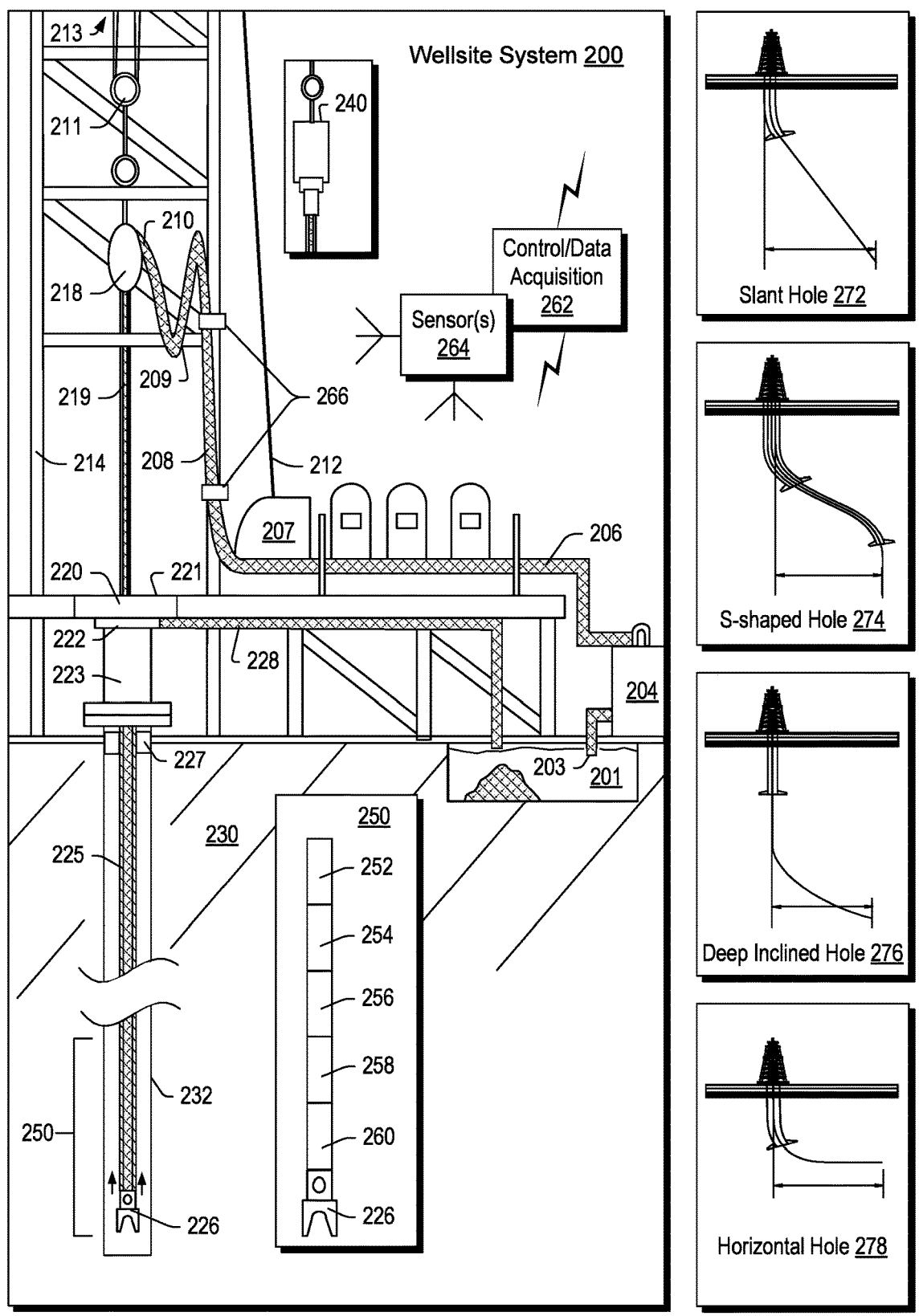
FIG. 2 illustrates an example of a system and examples of types of holes.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

In accordance with one or more embodiments as described herein, relatively large diameter bottom hole assembly components (e.g., stabilizers, centralizers, kick pads on the mud motor and the bit, reamers, underrreamers, hole enlargement equipment, etc.) may be used as "test probes" to predict the location of a "tight spot" during tripping, reaming, backreaming, and/or other types of operations. As described herein, a "tight spot" may refer to a location in a borehole in which one or more in-ground obstructions are present and restrict the wellbore diameter, potentially interfering with the operations of a bottom hole assembly (BHA). As an illustrative example, the presence of obstructions may be due to the presence of unremoved cuttings that were previously left in a hole formed by the BHA, as a result of a geometric restriction in the wellbore, and/or as the presence of another type of obstruction.

In some implementations, obstructions (e.g., referred to herein as "tight spots") associated with well construction and/or drilling operations may be detected by monitoring analytics data and surface measurements of a BHA. Example data that is monitored may include overpull of the BHA, the presence of weight/force during a slacking off operation, a sudden increase (e.g., a spike) in torque, a spike in pressure, a sudden shift in block position, or the like. As described herein, the depths of the probes may be determined when a tight spot is detected. Information identifying the depths may be stored in a table from which a composite log may be generated to form a profile that identifies tight spot depths (e.g., referred to herein as "a tight spot profile").

Using the tight spot profile, various actions may be executed, for example, computer-based actions and/or actions related to the manner in which future drilling operations are conducted. For example, in some implementations, computer-based instructions may be executed to modify computer-controlled drilling operations, as to avoid tight spots, and/or to navigate tight spots to reduce the likelihood of damage equipment to perform an action for clearing out previously unremoved cuttings, compensate for geometric restrictions in the wellbore, or the like. In embodiments, computer-based instructions may be executed for generation of visual reports representing the tight spot profile, the tight spot table, the tight spot composite log, a graph illustrating tight spot depths and corresponding drilling activity, or the like. From the visual reports, subject-matter experts and/or machine-learning/artificial intelligence systems may make determinations for modifying future drilling operations to improve safety, reliability, equipment performance, equipment longevity, and/or drilling efficiency. Also, one or more embodiments, described herein, may be incorporated into a system that detects stuck pipe tendencies.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

In some implementations, one or more embodiments may utilize the use of sensors to generate new data relating to measurements indicative of the presence of tight spots. This new data is in turn used to detect the location of tight spots and build a tight spot profile. In some implementations, raw data from one or more sensors is processed in a particular manner to improve the technology and operations of well construction. In some implementations, embodiments of the present disclosure provide a particular solution through the use of rules and criteria (e.g., relating to sensor measurement readings and thresholds) to solve a particular problem relating to the location of tight spots. In some implementations, the use of rules and the use of sensor measurement readings as criteria may eliminate human subjectivity in modifying the operations of drilling activities (although it is appreciated that the use of human analysis and the discretion of subject matter and safety experts is not necessarily precluded when modifying the operations of drilling activities).

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drill string, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drill string that can be pulled out of the hole and/or place or replaced in the hole. As an example, a pipe trip may be performed where a drill bit has dulled or has otherwise ceased to drill efficiently and is to be replaced.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventers (BOPS) 223, a drill string 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drill string 225 is suspended within the borehole 232 and has a drill string assembly 250 that includes the drill bit 226 at its lower end. As an example, the drill string assembly 250 may be a bottom hole assembly (BHA).

The wellsite system 200 can provide for operation of the drill string 225 and other operations. As shown, the wellsite system 200 includes the platform 211 and the derrick 214 positioned over the borehole 232. As mentioned, the wellsite system 200 can include the rotary table 220 where the drill string 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drill string 225, while allowing the drill string 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drill string 225. As an example, the top drive 240 can include one or more motors (e.g., electric and/or hydraulic) connected with appropriate gearing to a short section of pipe called a quill, that in turn may be screwed into a saver sub or the drill string 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drill string 225 (e.g., including one or more downhole tools) may be composed of a series of pipes threadably connected together to form a long tube with the drill bit 226 at the lower end thereof. As the drill string 225 is advanced into a wellbore for drilling, at some point in time prior to or coincident with drilling, the mud may be pumped by the pump 204 from the mud tank 201 (e.g., or other source) via the lines 206, 208 and 209 to a port of the kelly 218 or, for example, to a port of the top drive 240. The mud can then flow via a passage (e.g., or passages) in the drill string 225 and out of ports located on the drill bit 226 (see, e.g., a directional arrow). As the mud exits the drill string 225 via ports in the drill bit 226, it can then circulate upwardly through an annular region between an outer surface(s) of the drill string 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drill string 225 may, after exiting the drill string 225, form a mudcake that lines the wellbore which, among other functions, may reduce friction between the drill string 225 and surrounding wall(s) (e.g., borehole, casing, etc.). A reduction in friction may facilitate advancing or retracting the drill string 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drill string 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drill string 225) may be transmitted uphole to an uphole device, which may relay such information to other equipment for processing, control, etc.

As an example, telemetry equipment may operate via transmission of energy via the drill string 225 itself. For example, consider a signal generator that imparts coded energy signals to the drill string 225 and repeaters that may receive such energy and repeat it to further transmit the coded energy signals (e.g., information, etc.).

As an example, the drill string 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the module 256 of the drill string assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drill string 225 and the drill bit 226. As an example, the MWD tool 254 may include equipment for generating electrical power, for example, to power various components of the drill string 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drill string can include a positive displacement motor (PDM).

As an example, a system may be a steerable system and include equipment to perform method such as geosteering. As an example, a steerable system can include a PDM or of a turbine on a lower part of a drill string which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drill string can include an azimuthal density neutron (AND) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drill string, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drill string may become "stuck." The term "stuck," in this context, refers to the inability to move or remove a drill string from a bore. As an example, in a stuck condition, it might be possible to rotate pipe but not move it axially, or could be both rotationally and axially stuck.

Furthermore, "differential sticking" is a condition whereby the drill string cannot be moved (e.g., rotated or reciprocated) along the axis of the bore. Differential sticking may occur when high-contact forces caused by low reservoir pressures, high wellbore pressures, or both, are exerted over a sufficiently large area of the drill string.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, "mechanical sticking" is a condition where motion of the drill string is limited or prevented by a mechanism other than differential pressure sticking occurs. Mechanical sticking can be caused, for example, by one or more of junk in the hole, wellbore geometry anomalies (e.g., ledges or restrictions), cement, keyseats or a buildup of cuttings in the annulus.

Figure 3:
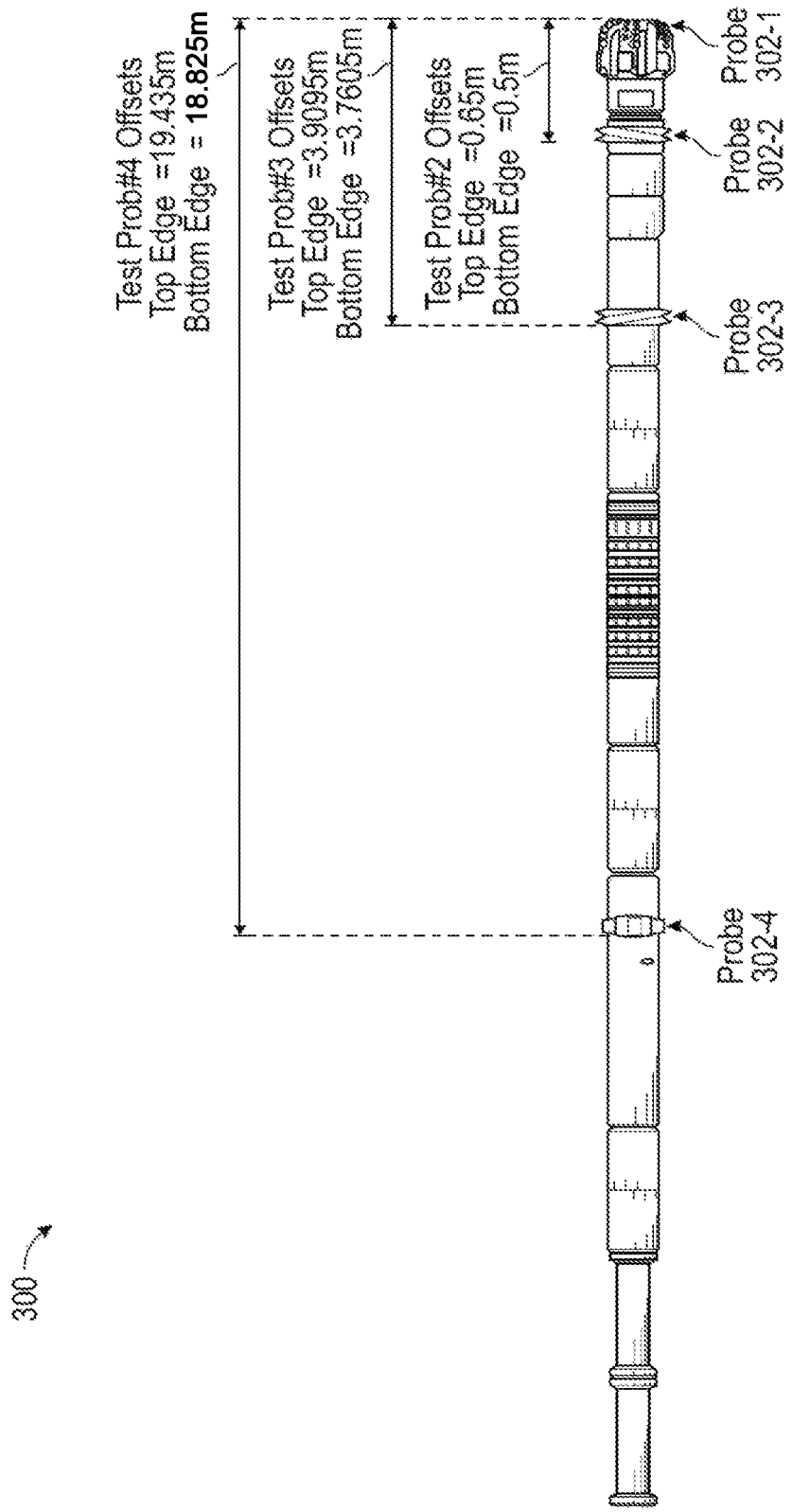
FIG. 3 shows an example of a bottom hole assembly (BHA) with test probes used to implement one or more aspects of the present disclosure.

FIG. 3 shows an example of a bottom hole assembly (BHA) with test probes used to implement one or more aspects of the present disclosure. As shown in FIG. 3, a BHA 300 may include test probes, such as probes 302-1, 302-2, 302-3, and 302-4 (also referred to collectively as "probes 302"). In some implementations, the BHA 300 may correspond to the distal portion of the drill string assembly 250 of FIG. 2. As described herein, components of the BHA 300 may be used as test probes. That is, one or more of probes 302-1, 302-2, 302-3, and 302-4 may include stabilizers, kick pads, bits, etc. As an illustrative, non-limiting example, the probe 302-1 may include a bit, whereas the probe 302-2 may include a stabilizer. As described herein, each probe 302 includes offsets (e.g., bottom edge and top edge offsets). As described herein, a "top edge offset" refers to a distance between a distal end of the BHA 300 and a "top edge" of a probe 302 (e.g., an edge of the probe 302 that is closest to the distal end of the BHA 300). A "bottom edge offset" refers to a distance between a distal end of the BHA 300 and a "bottom edge" of a probe 302 (e.g., an edge opposite of the "top edge"). In embodiments, and as described in greater detail herein, each bottom edge and top edge offset may be used to determine the depth of each probe 302 when a possible tight spot is detected. Also, it is noted that in practice, the BHA 300 may include additional, fewer, or differently arranged components than shown in FIG. 3.

Figure 4:
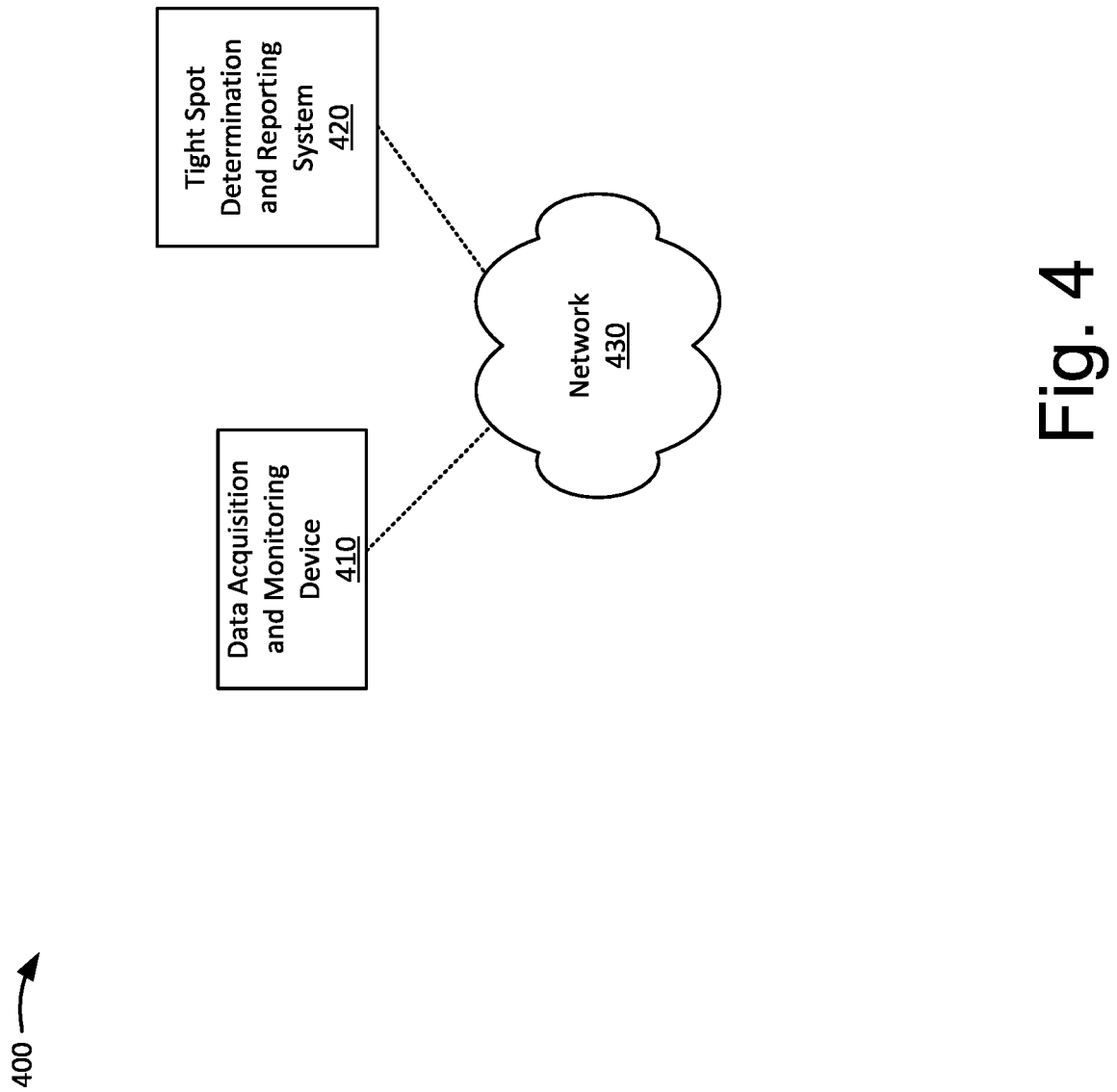
FIG. 4 shows an example environment as described herein.

FIG. 4 shows an example environment in accordance with aspects of the present disclosure. As shown in FIG. 4, environment 400 may include a data acquisition and monitoring device 410, a tight spot determination and reporting system 420, and a network 430.

The data acquisition and monitoring device 410 may include one or more computing devices that receives and monitors analytics data associated with the BHA 300, such as overpull, weight on bit, weight on reamer, hookload, torque measurements, stress measurements, pressure measurements, block position, etc. In some implementations, the data acquisition and monitoring device 410 receives sensor and/or measurement data (e.g., corresponding to the analytics data) from the LWD module 254, the MWD module 256, and/or the sensors 264. In some implementations, the data acquisition and monitoring device 410 provides the analytics data to the tight spot determination and reporting system 420.

The tight spot determination and reporting system 420 may include one or more computing devices that determines the presence of tight spots based on analytics data received from the data acquisition and monitoring device 410. In some implementations, the tight spot determination and reporting system 420 may detect the presence of a possible tight spot based on data measurements satisfying a threshold, determine probe depths at the tight spot based on the drill string direction, store probe depth information in a tight spot table, generate a tight spot composite log from the tight spot table, generate a tight spot profile, and execute a mitigating instruction based on the tight spot profile and/or tight spot composite log. In some implementations, the tight spot determination and reporting system 420 may correspond to the control/data acquisition 262. Additionally, or alternatively, the tight spot determination and reporting system 420 may perform one or more operations of the control/data acquisition 262, or vice versa.

The network 430 may include network nodes, such as network nodes 10 of FIG. 2. Additionally, or alternatively, the network 430 may include one or more wired and/or wireless networks. For example, the network 430 may include a cellular network (e.g., a second generation (2G) network, a third generation (3G) network, a fourth generation (4G) network, a fifth generation (2G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 430 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 430 may include copper transmission cables, optical transmission fibers, wireless transmission, routers, firewalls, switches, gateway computers and/or edge servers.

In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400. Devices of the environment 400 may interconnect via wired connections, wireless connections, or a combination of wired and wireless connections.

Figure 5:
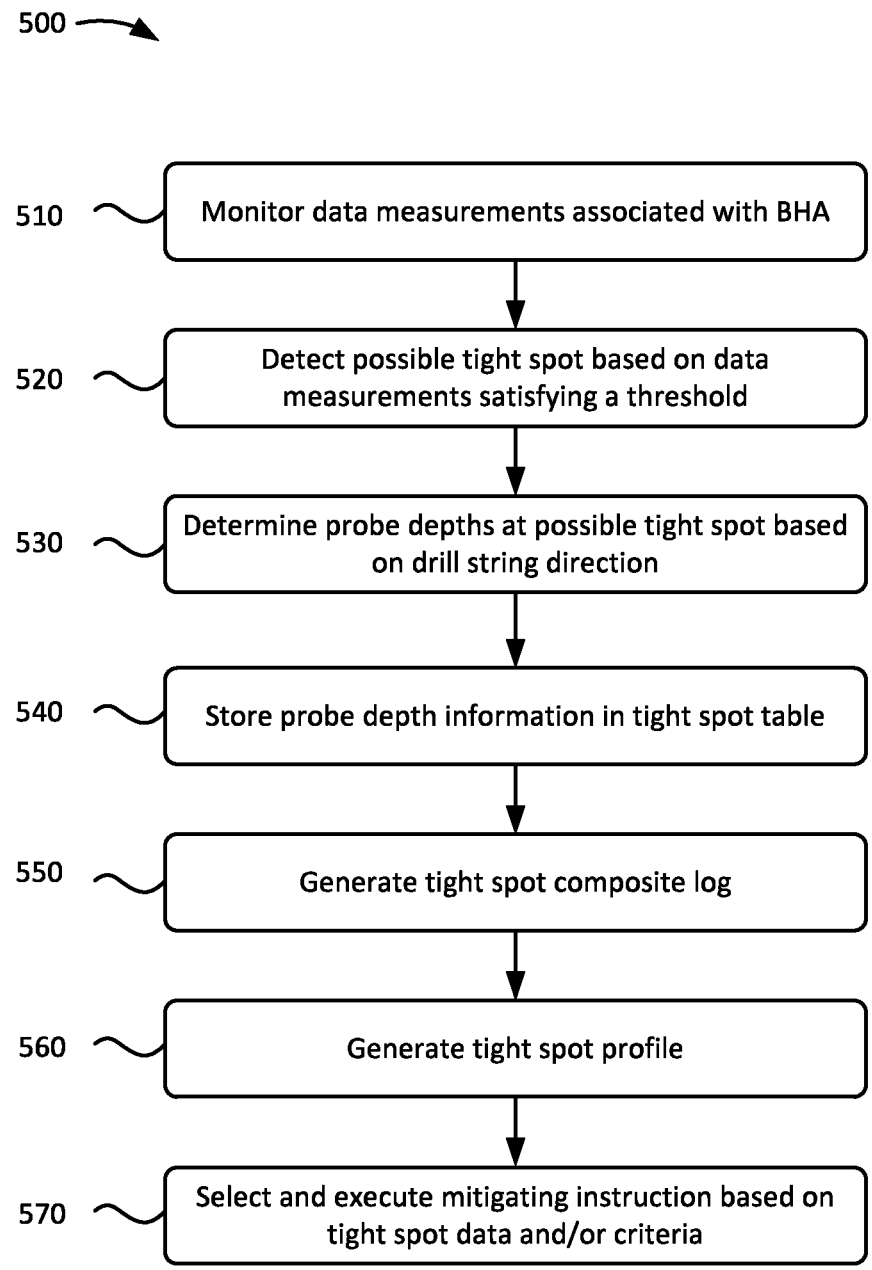
FIG. 5 shows an example flowchart of a process for generating a tight spot profile and executing instructions to mitigate tight spots.

FIG. 5 shows an example flowchart of a process 500 for generating a tight spot profile and executing instructions to mitigate tight spots. The actions illustrated in FIG. 5 may be implemented in the environment of FIG. 4, for example, and are described using reference numbers of elements depicted in FIG. 4. As noted above, the flowchart illustrates example functionality and example operations of possible implementations of systems, methods, and computer program products according to various embodiments of the present disclosure.

As shown in FIG. 5, the process 500 includes monitoring data measurements associated with the BHA, as at 510. For example, the tight spot determination and reporting system 420 may monitor analytics data (e.g., data measurements) associated with the BHA 300, such as torque measurements, stress measurements, pressure measurements, block position, etc. In some implementations, the tight spot determination and reporting system 420 may obtain the data measurements from one or more of the data acquisition and monitoring device 410, the LWD module 254, the MWD module 256, and/or the sensors 264.

The process 500 also includes detecting a possible tight spot based on data measurements satisfying a threshold, as at 520. For example, the tight spot determination and reporting system 420 may detect a possible tight spot based on data measurements (e.g., from the analytics data obtained at 510) satisfying one or more thresholds (e.g., criteria or rules defining tight spots based on data measurements). As an illustrative example, the tight spot determination and reporting system 420 may detect a possible tight spot when torque measurements, stress measurements, pressure measurements, block position, etc. exceed respective thresholds. Additionally, or alternatively, the tight spot determination and reporting system 420 may detect a possible tight spot when the changes and/or rate of changes to one or measurements exceeds a threshold (e.g., indicating spikes in measurements such as spikes in force/weight, spikes in torque, spikes in block position, etc.).

The process 500 further includes determining probe depths at the possible tight spot based on a direction of the drill string, as at 530. For example, the tight spot determination and reporting system 420 may determine the depths of the probes (e.g., any of the probes 302) relative to the location in which the possible tight spot was detected (e.g., as detected at 520). The depth the probes 302 is based on the operating direction of the drill string when the possible tight spot was detected. For example, when the operating direction is up, the depth of each probe 302 is the bit depth minus the top edge offset. When the operating direction is down, the depth of each probe 302 is the bit depth minus the bottom edge offset. Examples of probes' 302 top and bottom edge offset from the bit are shown in FIG. 3.

The process 500 also includes storing the probe depth information in a tight spot table, as at 540. For example, the tight spot determination and reporting system 420 may store the probe depth information (e.g., determined at 530). In some implementations, the tight spot determination and reporting system 420 may store the probe depth information in a data structure that identifies the bit depth for each possible tight spot and the corresponding probe depths. An example tight spot table is represented by data structure 600 as shown FIG. 6. Referring to FIG. 6, information identifying the depth of each probe is stored in the data structure 600. The probe depths are stored at each instance a possible tight spot is detected (e.g., each time data measurements exceed a threshold). As described herein, process steps 510-540 may be recurring such that each time a possible tight spot is detected, the probe depth information is stored in the tight spot table.

Figure 7:
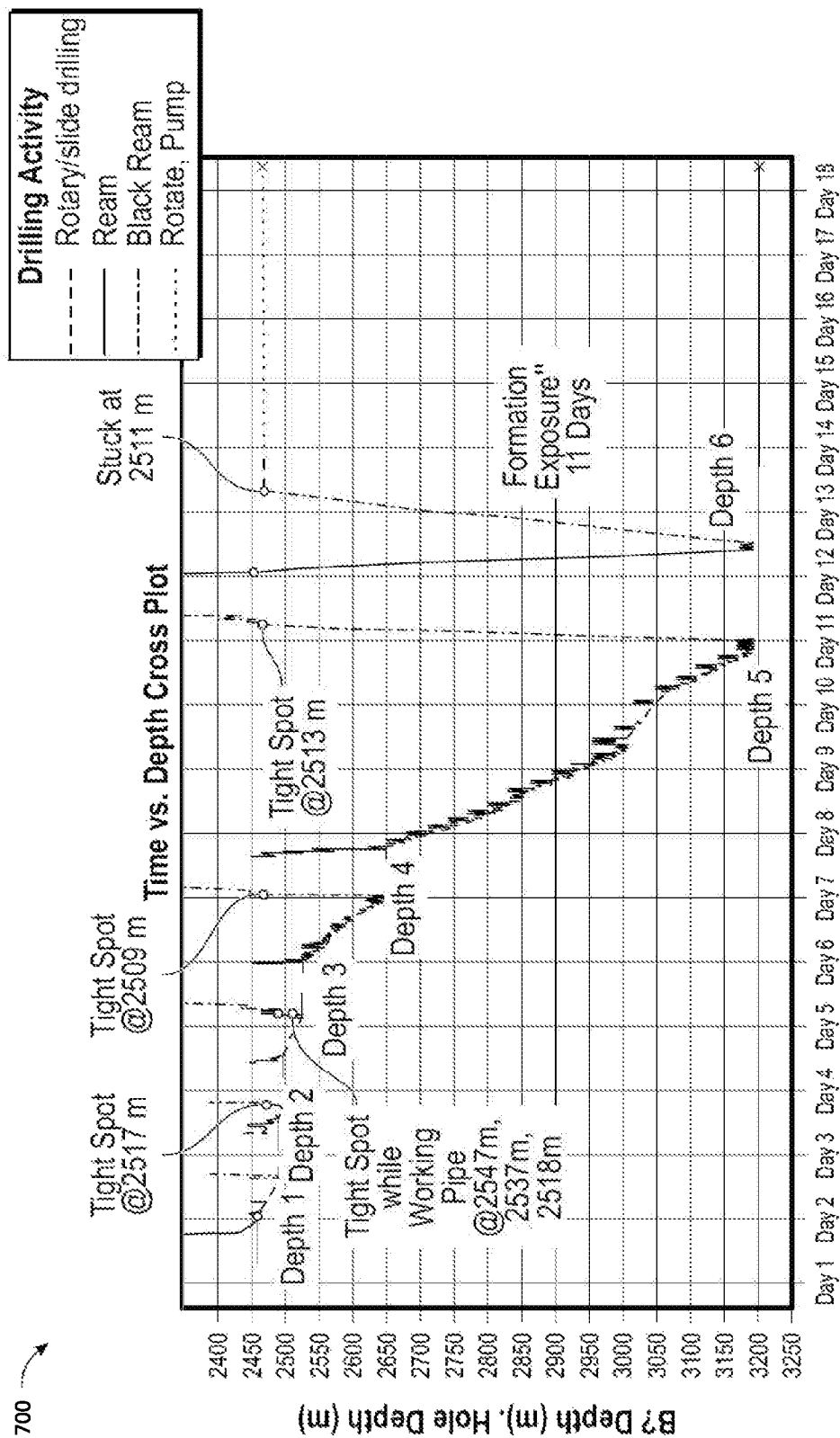
FIG. 7 shows an example graph of example probe activity during drilling activity over a period of time.
Figure 8:
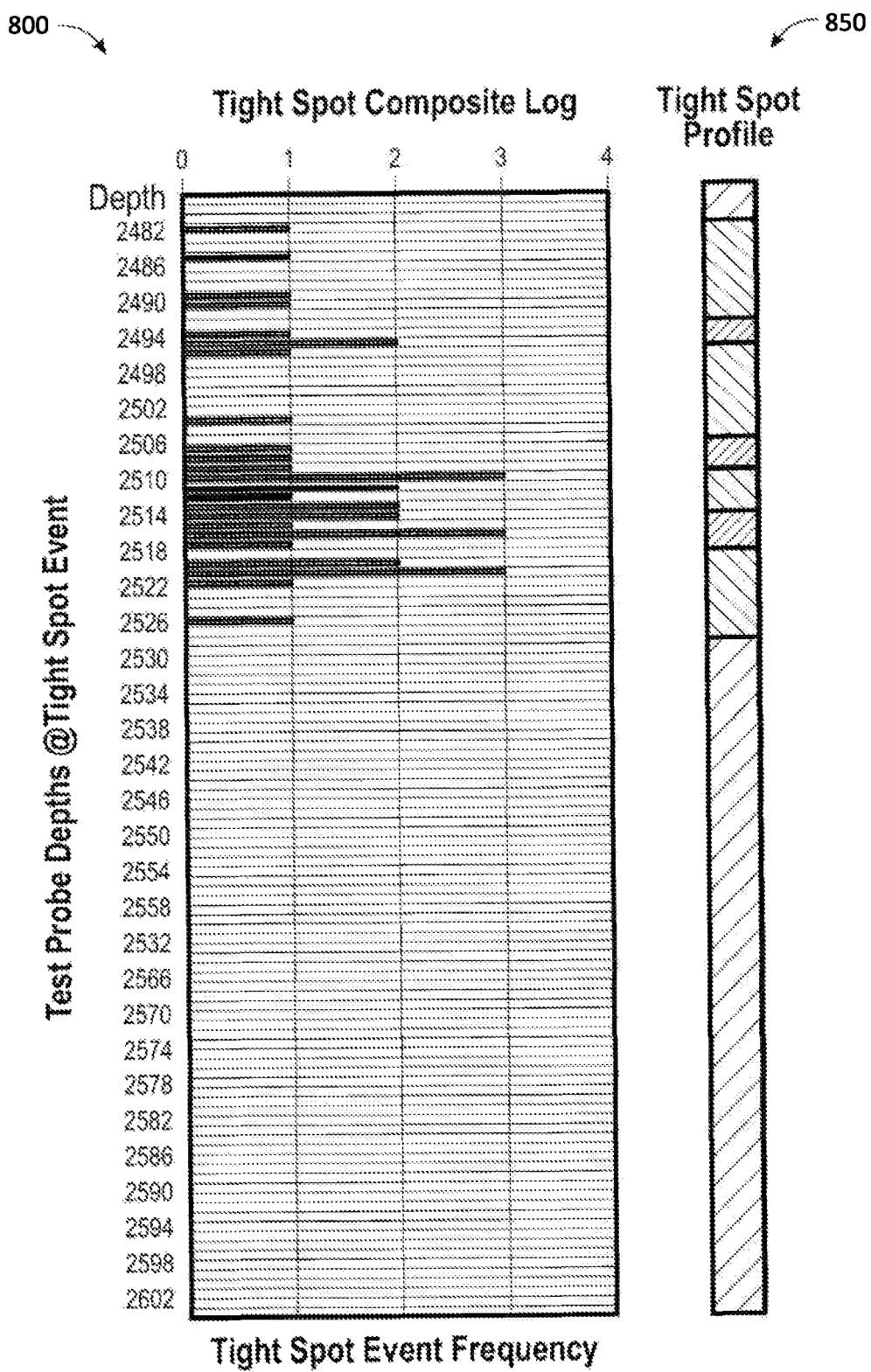
FIG. 8 illustrates an example tight spot composite log and an example tight spot profile in accordance with aspects of the present disclosure.

Returning to FIG. 5, the process 500 further includes generating a tight spot composite log, as at 550. For example, the tight spot determination and reporting system 420 may generate a tight spot composite log based on the information from the tight spot table (e.g., the probe depths recorded in the tight spot table each time a possible tight spot is detected at 520). An example tight spot composite log is represented by data structure 650 as shown FIG. 6. Referring to FIG. 7, the tight spot composite log identifies different depths and a count or number of times each depth was identified in the tight spot table (e.g., in data structure 600). In the example shown in FIG. 7, the depth of 2500 meters was present on four separate occasions by four separate probes, indicating that 2500 meters is most likely a tight spot. Another example of the tight spot composite log is shown in FIG. 8 (e.g., tight spot composite log 800). In the example of FIG. 8, the depths of 2506 meters, 2514 meters, and 2518 meters are likely tight spots based on frequency of these depths having been observed as tight spot events (e.g., three times each).

Returning to FIG. 5, the process 500 also includes generating tight spot profile, as at 550. For example, the tight spot determination and reporting system 420 may generate a tight spot profile that visually identifies the frequency of tight spot events at various probe depths. An example of a tight spot profile is shown in FIG. 8 (e.g., tight spot profile 850) in which the tight spot profile 850 is represented as a patterned graph in which different patterns represent the frequency/likelihood/tight spot severity of a particular depth (or range of depths) being a tight spot. In one or more alternative implementations, the tight spot profile may be represented with colors. In the example shown in FIG. 8, the tight spot profile visually displays the likely depths in which a tight spot is present. Additionally, or alternatively, the tight spot profile visually displays the severity of the tight spots. As described herein, the tight spot profile may be displayed in order for an administrator and/or subject matter expert to quickly and easily identify tight spot depths.

Returning to FIG. 5, the process 500 further includes selecting and executing a mitigating instruction based on tight spot data and/or criteria, as at 570. For example, the tight spot determination and reporting system 420 may select a mitigating instruction based on tight spot data and one or more criteria. In embodiments, the tight spot data may include the data stored in the tight spot table, the tight spot composite log, and/or the tight spot profile.

In some implementations, the tight spot determination and reporting system 420 may select one or more of multiple possible mitigating instructions based on one or more criteria. As an illustrative example, the tight spot determination and reporting system 420 may select a computer-based mitigating instruction to control and alter drilling operations at a particular depth based on load and/or torque measurements at tight spot depths identified in the tight spot profile. For example, the mitigating instructions may include a computer-based control instruction for the BHA 300 to adjust, reduce, or vary the drill speed, trip speed, and/or pressure applied by a bit of the BHA 300 at a depth corresponding to a tight spot (e.g., to more effectively and safely navigate through the tight spot while reducing damage to drilling equipment and improving safety). Additionally, or alternatively, the mitigating instructions may include a computer-based control instruction to generate a report that visually presents the tight spot table, the tight spot composite log, the tight spot profile, a graph identifying tight spot depths, or the like (e.g., for use as a risk profile for future activity across the identified tights spot depths). Additionally, or alternatively, the mitigating instruction may include an instruction to determine and output information regarding a probability of stuck pipe tendencies or wellbore stability risk based on the tight spot profile (e.g., by inputting the tight spot profile into an algorithm for determining the probability of stuck pipe tendencies). In some implementations, the mitigating instruction may include an instruction to store the profile in a digital format and/or output the tight spot profile as an input to one or more external systems that implement algorithms used to detect the probability of stuck pipe tendencies.

Based on selecting the mitigating instruction, the tight spot determination and reporting system 420 executes the mitigating instruction. In this way, the tight spot can be identified and future drilling operations may be modified to accommodate the presence of the tight spot. For example, the execution of the computer-based mitigating instructions results in improving equipment effectiveness and safety when navigating through the tight spot, notifying appropriate personnel about the tight spot in order to drive/adjust program decisions in light of the tight spot, modifying equipment to accommodate the tight spot, and/or modify drilling operations in some other manner).

FIG. 6 shows example data structures of a tight spot table and tight spot composite log in accordance with aspects of the present disclosure. As described above with respect to FIG. 5, data structure 600 represents a tight spot table in which the tight spot table stores probe depth information at each instance of a possible tight spot. As described above with respect to FIG. 5, data structure 650 represents a tight spot composite log that identifies different depths and a count or number of times each depth was identified in the tight spot table (e.g., in data structure 600).

FIG. 7 shows an example graph of example probe activity during drilling activity over a period of time. Graph 700 in FIG. 7 illustrates drilling depths at various times during different types of drilling activities (e.g., rotary/slide drilling, reaming, back reaming, rotate/pump). As further shown, graph 700 identifies tight spots at various depths corresponding to probe depths when possible tight spots are detected (e.g., when data measurements satisfy/exceed thresholds). As shown in graph 700, tight spots are detected at various depths (e.g., from 2513 meters to 2547 meters) at various stages and depths of a drilling process.

FIG. 8 illustrates an example tight spot composite log and an example tight spot profile in accordance with aspects of the present disclosure. As described above with respect to FIG. 5, the tight spot composite log 800 shows that depths of 2506 meters, 2514 meters, and 2518 meters are likely tight spots based on frequency of these depths having been observed as tight spot events (e.g., three times each).

As described above with respect to FIG. 5, the tight spot profile 850 is represented as a patterned (or colored) graph in which different patterns/colors represent the frequency/likelihood of a particular depth (or range of depths) being a tight spot. In the example shown in FIG. 8, the tight spot profile visually shows the likely depths in which a tight spot is present. As described herein, the tight spot profile may be displayed in order for an administrator and/or subject matter expert to quickly and easily identify tight spot depths.

FIG. 9 illustrates example components of a device 900 that may be used within environment 200 of FIG. 2. The device 900 may correspond to the data acquisition and monitoring device 410 and/or tight spot determination and reporting system 420. Each of the data acquisition and monitoring device 410 and/or the tight spot determination and reporting system 420 may include one or more devices 900 and/or one or more components of the device 900. Additionally, or alternatively, one or more components from the device 900 may be used within one or more components of the wellsite system 200 illustrated in FIG. 2.

As shown in FIG. 9, the device 900 may include a bus 905, a processor 910, a main memory 915, a read only memory (ROM) 920, a storage device 925, an input device 950, an output device 955, and a communication interface 940.

The bus 905 may include a path that permits communication among the components of device 900. The processor 910 may include a processor, a microprocessor, an application specific integrated circuit (ASIC), a field programmable gate array (FPGA), or another type of processor that interprets and executes instructions. The main memory 915 may include a random-access memory (RAM) or another type of dynamic storage device that stores information or instructions for execution by the processor 910. The ROM 920 may include a ROM device or another type of static storage device that stores static information or instructions for use by the processor 910. The storage device 925 may include a magnetic storage medium, such as a hard disk drive, or a removable memory, such as a flash memory.

The input device 950 may include a component that permits an operator to input information to the device 900, such as a control button, a keyboard, a keypad, or another type of input device. The output device 955 may include a component that outputs information to the operator, such as a light emitting diode (LED), a display, or another type of output device. The communication interface 940 may include any transceiver-like component that enables the device 900 to communicate with other devices or networks. In some implementations, the communication interface 940 may include a wireless interface, a wired interface, or a combination of a wireless interface and a wired interface. In embodiments, the communication interface 940 may receiver computer readable program instructions from a network and may forward the computer readable program instructions for storage in a computer readable storage medium (e.g., the storage device 925).

The device 900 may perform certain operations, as described in detail below. The device 900 may perform these operations in response to the processor 910 executing software instructions contained in a computer-readable medium, such as the main memory 915. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into the main memory 915 from another computer-readable medium, such as the storage device 925, or from another device via the communication interface 940. The software instructions contained in the main memory 915 may direct the processor 910 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, the device 900 may include additional components, fewer components, different components, or differently arranged components than are shown in FIG. 9.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-implemented method comprising:
monitoring, by a computing device, data measurements taken by a probe coupled with a bottom hole assembly (BHA);
detecting, by the computing device, a possible tight spot instance based on a data measurement of the data measurements satisfying a threshold;
determining, by the computing device, information identifying a probe depth of the probe for the possible tight spot instance, wherein the probe depth is determined at least partially based on an offset of the probe from the BHA and an operating direction of the BHA;
storing, by the computing device and in a table, the information identifying the probe depth for the possible tight spot instance in a wellbore;
generating, by the computing device, a profile identifying tight spot depths in the wellbore based on information stored in the table; and
executing, by the computing device, a mitigating instruction based on the profile to mitigate the presence of the identified tight spot depths.

2. The method of claim 1, further comprising generating a composite log based on the information stored in the table, wherein the profile is further generated based on the composite log.

3. The method of claim 1, wherein the data measurements include at least one selected from the group consisting of:

torque measurements;
pressure measurements;
block position measurements;
hookload measurements;
a rate or change in torque measurements;
a rate or change in pressure measurements;
a rate or change in block position measurements; or
a rate or change in hookload measurements.

4. The method of claim 1, wherein the satisfying the threshold comprises exceeding the threshold.

5. The method of claim 1, further comprising selecting the mitigating instruction from among a plurality of mitigating instructions based on the data measurements and one or more criteria.

6. The method of claim 1, wherein the mitigating instructions include at least one selected from the group consisting of:
a control instruction for the operations of the BHA;
an instruction to generate a report that visually presents the table or profile for use as a risk profile for future activity across the identified tights spot depths;
an instruction to store the profile in a digital format; or
an instruction to input the profile into an algorithm for determining stuck pipe tendencies or wellbore stability risk.

7. The method of claim 6, wherein the control instruction comprises an instruction to adjust, reduce, or vary the drill speed, trip speed, or pressure applied by a component of the BHA at a depth corresponding to a tight spot depth.

8. The method of claim 1, wherein the probe comprises a plurality of probes, wherein detecting the possible tight spot instance is based at least in part on data measurements from one or more of the plurality of probes satisfying the threshold, and wherein determining information identifying the probe depth comprises identifying probe depths for each of the plurality of probes based on an offset of each of the probes from the BHA and the operating direction.

9. The method of claim 8, wherein the plurality of probes comprise at least one selected from the group consisting of:
a drill bit;
a stabilizer;
a kick pad;
a hole enlargement equipment; or
an underreamer.

10. The method of claim 8, wherein generating the profile comprises:
determining a frequency of the data measurements representing a possible tight spot at a particular depth; and
determining that the possible tight spot instance at the particular depth is a tight spot based at least in part on the frequency.

11. A computer program product comprising a non-transitory computer readable storage medium having program instructions embodied therewith, the program instructions executable by a computing device to cause the computing device to:
monitor data measurements taken by a probe coupled with a bottom hole assembly (BHA);
detect a possible tight spot instance based on a data measurement of the data measurements satisfying a threshold;
determine information identifying a probe depth of the probe for the possible tight spot instance, wherein the probe depth is determined at least partially based on an offset of the probe from the BHA and an operating direction of the BHA;

store, in a table, the information identifying the probe depth for the possible tight spot instance in a wellbore;
generate a profile identifying tight spot depths based on information stored in the table; and
execute a mitigating instruction based on the profile to mitigate the presence of the identified tight spot depths.

12. The computer program product of claim 11, wherein the program instructions further cause the processor to generate a composite log based on the information stored in the table, wherein the profile is further generated based on the composite log.

13. The computer program product of claim 11, wherein the data measurements included at least one selected from the group consisting:
torque measurements;
pressure measurements;
block position measurements;
hookload measurements;
a rate or change in torque measurements;
a rate or change in pressure measurements;
a rate or change in block position measurements; or
a rate or change in hookload measurements.

14. The computer program product of claim 11, wherein the program instructions further cause the processor to select the mitigating instruction from among a plurality of mitigating instructions based on the data measurements and one or more criteria.

15. The computer program product of claim 11, wherein the mitigating instructions include at least one selected from the group consisting of:
a control instruction for the operations of the BHA;
an instruction to generate a report that visually presents the table or profile; or
an instruction to input the profile into an algorithm for determining stuck pipe tendencies.

16. The computer program product of claim 15, wherein the control instruction comprises an instruction to adjust, reduce, or vary the drill speed or pressure applied by a component of the BHA at a depth corresponding to a tight spot depth.

17. A system comprising:
a processor, a computer readable memory and a non-transitory computer readable storage medium associated with a computing device;
program instructions to monitor data measurements taken by a probe coupled with a bottom hole assembly (BHA);
program instructions to detect a possible tight spot instance based on a data measurement of the data measurements satisfying a threshold;
program instructions to determine information identifying a probe depth of the probe for the possible tight spot instance wherein the probe depth is determined at least partially based on an offset of the probe from the BHA and an operating direction of the BHA;
program instructions to store the information identifying the probe depth for the possible tight spot instance in a wellbore;
program instructions to generate a profile identifying tight spot depths based on information stored in the table; and
program instructions to execute a mitigating instruction based on the profile to mitigate the presence of the identified tight spot depths,
wherein the program instructions are stored on the computer readable storage medium for execution by the processor via the computer readable memory.

18. The system of claim 17, further comprising program instructions to a composite log based on the information stored in the table, wherein the profile is further generated based on the composite log.

19. The system of claim 17, wherein the data measurements includes at least one selected from the group consisting of:
- torque measurements;
- pressure measurements;
- block position measurements;
- overpull measurements;
- a rate or change in torque measurements;
- a rate or change in pressure measurements;
- a rate or change in block position measurements; or
- a rate or change in hookload measurements.

20. The system of claim 17, further comprising program instructions to select the mitigating instruction from among a plurality of mitigating instructions based on the data measurements and one or more criteria.

21. The system of claim 17, wherein the mitigating instructions include at least one selected from the group consisting of:
- a control instruction for the operations of the BHA;
- an instruction to generate a report that visually presents the table or profile; and
- an instruction to input the profile into an algorithm for determining stuck pipe tendencies.

22. The system of claim 21, wherein the control instruction comprises an instruction to adjust, reduce, or vary the drill speed or pressure applied by a component of the BHA at a depth corresponding to a tight spot depth.

* * * * *